April 26, 1960      D. APOTHEKER      2,934,575
PROCESS OF POLYMERIZING ACETYLENE TO MONOVINYLACETYLENE
Filed May 9, 1958
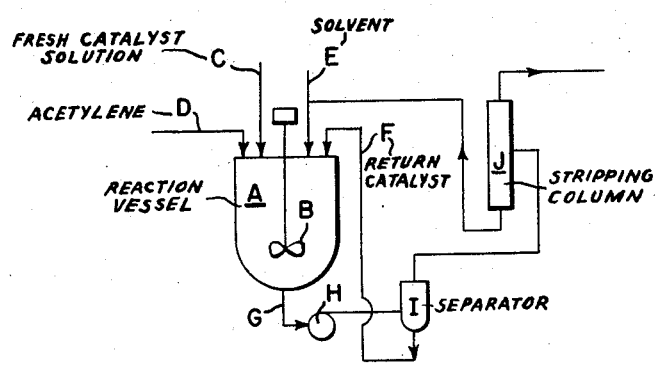
INVENTOR
DAVID APOTHEKER
BY *Walter H. Stimbaugh Jr.*
ATTORNEY

United States Patent Office 2,934,575
Patented Apr. 26, 1960

2,934,575

PROCESS OF POLYMERIZING ACETYLENE TO MONOVINYLACETYLENE

David Apotheker, Anchorage, Ky., assignor to E. I. du Pont de Nemours and Company, Wilmington, Del., a corporation of Delaware Application May 9, 1958, Serial No. 734,211

4 Claims. (Cl. 260—678)

This invention is directed to the manufacture from acetylene of monovinylacetylene, an intermediate in the manufacture of neoprene synthetic rubber (polychloroprene). More particularly, the present invention relates to the use of a new catalyst giving improved yields of monovinylacetylene from acetylene and improved rates of conversion.

It is known that water, the solvent generally used for the catalyst composed of cuprous chloride and potassium chloride or other water-soluble chloride used in polymerizing acetylene to monovinylacetylene, may be replaced by certain other solvents such as N-substituted carboxylic acid amides, and that valuable results are obtained, using the latter solvent, when the solvent is anhydrous and when the second chloride is a hydrochloride of a primary or secondary aliphatic amine containing not more than six carbon atoms; representative amines are: monomethylamine, dimethylamine, monoethylamine, dipropylamine, monobutylamine and monohexylamine. The advantages of these catalysts over aqueous catalysts for polymerizing acetylene to monovinylacetylene include greater rates of production per volume of catalyst and reduction or elimination of the formation of oxygen compounds as by-products.

It has now been discovered that further unexpected advantages in yield and conversion are obtained when an inert liquid hydrocarbon or chlorinated hydrocarbon is suspended in this catalyst solution, forming a separate phase.

It is an object of the present invention to provide a process of preparing monovinylacetylene in a higher yield and a higher rate of conversion. It is a further object of the present invention to provide a process wherein the ratio of monovinylacetylene to divinylacetylene produced is significantly improved. These and other objects will become apparent in the following description and claims.

More specifically, the present invention is directed to a process of polymerizing acetylene to monovinylacetylene by introducing acetylene into an anhydrous mixture composed of two immiscible liquid phases, one of which is an inert liquid hydrocarbon or chlorinated hydrocarbon phase and the other being a solution of cuprous chloride and a primary or secondary aliphatic amine hydrochloride in a carboxylic acid amine solvent.

The liquid hydrocarbon or chlorinated hydrocarbon forming one phase of the above catalyst should be substantially insoluble in the other phase and should dissolve substantially nothing from it; the preferred classes are aliphatic and hydroaromatic hydrocarbons. The requirement that the solvent should be inert means that it should not be polymerizable or reactive with the other ingredients, including the cuprous chloride. The solvent is not limited as to volatility; thus those boiling between the boiling points of monovinylacetylene (5° C.) and divinylacetylene (84° C.) and preferably between about 20 and about 70° C., form one preferred class, exemplified by methylene dichloride (B.P. 40° C.) n-pentane (B.P. 37° C.), and n-hexane (B.P. 69° C.). These solvents may be separated by distillation from both the monovinylacetylene and the divinylacetylene. Another preferred class has boiling points above about 200°, exemplified by tetrahydronaphthalene (B.P. 205° C.) and the petroleum fractions of kerosene type used in the examples. These allow the mono- and divinylacetylenes to be removed without distilling the whole mass.

Other suitable solvents are fuel oils, white oils, solvent naphthas, and chemical individuals such as toluene, the xylenes, cymene, mesitylene, decahydronaphthalene, cetane, cetyl chloride, tetrachloroethylene, monochlorobenzene, ortho-dichlorobenzene, chlorocyclohexane, and chloronaphthalene. The choice of solvent and of the ratio in which it is used with the cuprous chloride phase of the catalyst will depend in part on the method used for separating the monovinylacetylene.

The carboxylic acid amide component of the catalyst cuprous chloride solution should be liquid at the operating temperature and should contain not more than six carbon atoms. The hydrogens of the —$CONH_2$ group may be partly or completely substituted. This may be done by simple alkyl groups such as methyl or butyl or the nitrogen may be attached to hydrocarbon part of the carboxylic acid, forming a lactam. Examples of suitable solvents of this class are formamide, N,N'-dimethyl acetamide, diethyl acetamide, propionamide, butyramide, 2-piperidone, 2-pyrrolidone, and N-methyl-2-pyrrolidone. Dimethyl formamide is preferred. The primary and secondary amine hydrochlorides are derived from simple unsubstituted aliphatic amines containing not more than six carbon atoms. Dimethylamine hydrochloride is preferred. The molar ratio (taking cuprous chloride as $Cu_2Cl_2$) of amine hydrochloride to cuprous chloride should be greater than 1:1 and preferably not greater than 2.3:1. Although any concentration of the combined salts in the solution may be used, the more concentrated solutions are preferred.

The ratio of hydrocarbon phase to cuprous chloride phase may vary greatly, depending on the method used for separating the monovinylacetylene. The most useful range is between 10:1 and 1:10, by volume.

The ingredients of the catalyst and the acetylene fed to it should be anhydrous and precautions should be taken to exclude moisture throughout. It is usually desirable to have present in the catalyst a small amount of hydrogen chloride, to prevent the formation of precipitates.

This catalyst may be used in two different ways. The acetylene may be passed through it at such a rate that only a small part of it is polymerized and the monovinylacetylene resulting is swept out of the catalyst before much divinylacetylene and higher acetylene polymers are formed from it. The monovinylacetylene is then recovered, for example, by fractional condensation, and the acetylene is recycled. This is the method of U.S. 2,048,838 recently modified as in U.S. 2,759,985. In the latter the catalyst is passed downward through a tower containing perforated plates, counter-current to the flow of acetylene, which is broken up into bubbles on passage through each plate. The two liquid phases of the catalyst are also mutually dispersed as they pass downward. Another method of employing the catalyst is that wherein the acetylene is totally and continuously absorbed in the agitated catalyst and the polymers, largely monovinylacetylene, thus formed are removed by removing a portion of the mixed liquid catalyst from the reaction vessel, allowing it to stratify, returning the cuprous chloride phase to the reactor, removing the reaction products from the solvent phase, separating pure monovinylacetylene therefrom, and returning the solvent to the reaction vessel. In this way, a much higher conversion to monovinylacetylene is attained than by the preceding method, while still keeping low the formation of by-products.

In the latter process, in which the solvent phase is removed and separately processed, it is preferred to use large ratios of solvent to catalyst, between 2:1 and 10:1, by volume. The solvent used may be readily volatile and thus may be distilled and separated from the reaction products before return to the system or, if only very minor amounts of non-volatile by-products are formed, a non-volatile or slightly volatile solvent may be used and returned undistilled to the reaction vessel, after removal of the volatile reaction products. In the process in which the products are removed in the acetylene stream and the solvent remains in the catalyst, a non-volatile or slightly volatile solvent is preferred as the catalyst component.

The process may be operated at conventional temperatures, usually between 30 and 100° C. and preferably between 50 and 90° C. and at conventional pressures, from one to four atmospheres or higher, particularly when a dilute acetylene is used.

Representative examples illustrating the present invention are as follows.

Example 1

The catalyst consisted of 100 parts by weight of a solution of 46.4 parts of cuprous chloride and 23.6 parts of monomethylamine hydrochloride (giving a molar ratio of 1.5:1) in 30.0 parts dimethyl formamide, mixed with 70% by volume of a petroleum hydrocarbon fraction boiling between 190 and 210° C. To this was added 0.3% by weight of hydrogen chloride, based on the weight of the cuprous chloride solution. All ingredients were anhydrous.

The apparatus was that described in 2,759,985, having as its main feature a vertical column separated into compartments by horizontal perforated plates. The liquid catalyst is passed downward through the column and is recirculated from the bottom to the top by a pump. The acetylene is introduced at the bottom of the column through a nozzle which breaks it up into small bubbles. The gas as it passes upward counter-current to the flow of the catalyst is maintained in the form of small bubbles by passage through the successive perforated plates.

Operating at 95° C. and 49 lbs. per sq. in. absolute pressure, with a catalyst volume of 65 gal. and an acetylene feed of 275 lbs. per hour, monovinylacetylene was produced at the rate of 40.0 lbs. per hour, the conversion thus being 15.4%. Divinylacetylene was produced at the rate of 2.33 lbs. per hour, the MVA yield thus being 94.5%. Without the hydrocarbon solvent in the catalyst, and operating under otherwise the most favorable conditions, the yield at the same conversion rate was less than 93%.

Example 2

The catalyst was the same as used in Example 1 except that the hydrocarbon portion consisted of 5 volumes of kerosene for each volume of cuprous chloride solution.

The apparatus comprised the following parts, as is shown in the accompanying drawing.

A reaction vessel A is provided with a stirrer B, and with several inlets, C for fresh catalyst solution, D for acetylene, E for solvent, and F for returned catalyst. The reaction vessel is also provided with an outlet G, connected through a pump H to a separator I, in which the catalyst mixture from the reaction vessel A separates into an upper layer of kerosene containing the reaction products, and a lower layer of dimethylformamide containing dissolved cuprous chloride and methylamine hydrochloride. The lower layer is returned to the reaction vessel through F. The upper layer is kept for examination and analysis in experimental runs but in actual operation passes to a stripping column J in which the monovinylacetylene and acetylene and other acetylene polymers, if present, are removed and the solvent is returned to the reaction vessel through E. The acetylene, monovinylacetylene, and divinylacetylene are then separated from each other by fractional distillation and condensation. Not shown in the drawing are auxiliary equipment such as a drying column and regulating devices for the acetylene supplied through D, a thermostatically controlled bath for A, and rotameters, thermometers, and pressure gauges for determining conditions at various locations.

In the example, the catalyst mixture in the reaction vessel A was agitated by the stirrer to give a uniform dispersion and the pump was run so as to remove 4% of the volume of solvent mixture in the reaction vessel per minute and acetylene was introduced at the rate of 0.43 gram per minute per liter of total catalyst (both phases). The conversion at this rate was 94% and the yield between 73 and 81%. When the rate of solvent circulation was raised to 8.4% per minute, the conversion was 84% and the yield was 100%. Fresh solvent and fresh catalyst were added as needed during the runs through E and C, respectively, to make up for losses.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process of polymerizing acetylene to monovinylacetylene, at a temperature within the range of 30–100° C. and at least one atmosphere pressure, in which process acetylene is introduced into an anhydrous mixture composed of two immiscible phases, one of said phases being an inert liquid taken from the group consisting of liquid hydrocarbons and liquid chlorinated hydrocarbons and the other phase being a solution of cuprous chloride and a compound taken from the group consisting of a primary aliphatic amine hydrochloride containing not more than 6 carbon atoms and a secondary aliphatic amine hydrochloride containing not more than 6 carbon atoms in a liquid carboxylic acid amide containing not more than 6 carbon atoms as solvent.

2. The process of claim 1 wherein the inert liquid is an aliphatic hydrocarbon, the primary aliphatic amine is monomethylamine hydrochloride, and, the carboxylic acid amide is dimethylformamide.

3. A process of polymerizing acetylene to monovinylacetylene, at a temperature within the range of 30–100° C. and at a pressure within the range of 1 to about 4 atmospheres, in which process acetylene is introduced into an anhydrous mixture composed of two immiscible phases, one of said phases being an inert liquid taken from the group consisting of liquid hydrocarbons and liquid chlorinated hydrocarbons and the other phase being a solution of cuprous chloride and a compound taken from the group consisting of a primary aliphatic amine hydrochloride containing not more than 6 carbon atoms and a secondary aliphatic amine hydrochloride containing not more than 6 carbon atoms in a liquid carboxylic acid amide containing not more than 6 carbon atoms as solvent.

4. The process of claim 3 wherein the inert liquid is an aliphatic hydrocarbon, the primary aliphatic amine is monomethylamine hydrochloride, and, the carboxylic acid amide is dimethylformamide.

References Cited in the file of this patent

UNITED STATES PATENTS

| 1,964,399 | Hofsasz | June 26, 1934 |
| 2,161,645 | Vollman et al. | June 6, 1939 |
| 2,227,478 | Wolfram et al. | Jan. 7, 1941 |